(12) United States Patent
Chaiken et al.

(10) Patent No.: US 11,163,886 B2
(45) Date of Patent: Nov. 2, 2021

(54) INFORMATION HANDLING SYSTEM FIRMWARE BIT ERROR DETECTION AND CORRECTION

(71) Applicant: Dell Products L.P., Round Rock, TX (US)

(72) Inventors: Craig Lawrence Chaiken, Pflugerville, TX (US); Chun Yi Yang, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 358 days.

(21) Appl. No.: 16/145,401

(22) Filed: Sep. 28, 2018

(65) Prior Publication Data

US 2020/0104504 A1 Apr. 2, 2020

(51) Int. Cl.
G06F 21/57 (2013.01)
G06F 21/64 (2013.01)
G06F 1/32 (2019.01)

(52) U.S. Cl.
CPC .............. *G06F 21/575* (2013.01); *G06F 1/32* (2013.01); *G06F 21/572* (2013.01); *G06F 21/64* (2013.01)

(58) Field of Classification Search
CPC ................ G06F 1/32; G06F 9/44; G06F 21/57
See application file for complete search history.

(56) References Cited

U.S. PATENT DOCUMENTS

| 6,438,701 B1 | 8/2002 | Chaiken et al. |
| 6,587,966 B1 | 7/2003 | Chaiken et al. |
| 7,546,487 B2 | 6/2009 | Marisetty et al. |
| 2006/0256615 A1 | 11/2006 | Carson |
| 2008/0065845 A1 | 3/2008 | Montero et al. |
| 2009/0240990 A1* | 9/2009 | Gollub .................. G06F 11/079 714/45 |
| 2009/0281672 A1* | 11/2009 | Pourzia ................ A01G 25/167 700/284 |
| 2009/0300274 A1* | 12/2009 | Luo ...................... G06F 12/0246 711/103 |
| 2010/0169750 A1* | 7/2010 | Chew .................... G06F 21/572 714/807 |
| 2012/0084508 A1* | 4/2012 | Suzuki ................ G06F 11/2089 711/114 |
| 2013/0125107 A1* | 5/2013 | Bandakka ........... G06F 11/1448 717/171 |
| 2014/0344960 A1* | 11/2014 | Adams .................... G06F 21/57 726/34 |
| 2016/0188405 A1 | 6/2016 | Li et al. |
| 2016/0357462 A1* | 12/2016 | Nam ....................... G06F 3/068 |
| 2018/0046546 A1* | 2/2018 | Qiu ....................... G06F 11/106 |
| 2018/0121656 A1* | 5/2018 | Scherer, III ......... G06F 11/1469 |

* cited by examiner

*Primary Examiner* — Keshab R Pandey
(74) *Attorney, Agent, or Firm* — Zagorin Cave LLP; Robert W. Holland

(57) ABSTRACT

An information handling system embedded controller does not initiate a chipset having secure execution of chipset firmware unless the chipset firmware validates against error correcting checksums inserted into the embedded controller firmware. Comparing checksums calculated from chipset firmware against expected checksum values for the chipset firmware prevents secure chipset initiation failure due to bit errors associated with chipset firmware storage in flash memory.

16 Claims, 3 Drawing Sheets

INFORMATION HANDLING SYSTEM FIRMWARE BIT ERROR DETECTION AND CORRECTION

BACKGROUND OF THE INVENTION

Field of the Invention

The present invention relates in general to the field of information handling system memory management, and more particularly to information handling system firmware bit error detection and correction.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems generally process information with a central processing unit (CPU) that executes instructions stored in random access memory (RAM). Typically, an operating system executes on the CPU to manage interactions by applications with hardware components of the information handling system, such as with drivers of the operating system that interact with firmware of the hardware components. Generally, firmware refers to instructions stored in flash memory that operate on a processing component, such as a graphics controller, network interface card (NIC), an embedded controller and, more generally, a chipset that manages basic component interactions. An advantage of firmware is that executable code is available in persistent memory for a hardware component to execute from a power up condition so that the hardware component is prepared to interact with the CPU once the operating system boots. A disadvantage of firmware is that upgrades tend to be more difficult to perform since the operating system has to copy the firmware code to the persistent memory, typically flash memory, through management interfaces, such as the Serial Peripheral Interface (SPI).

Information handling system boot generally involves the execution of firmware to bring processing components into an operational state, from which the firmware can retrieve the operating system to RAM for execution by the CPU. Typically, the initial firmware involves pre-boot instructions executed by an embedded controller, such as a keyboard controller, that manages application of power to other components. The pre-boot instructions typically call a Basic Input/Output System (BIOS) or other component management instructions to the CPU, which initiates hardware interactions and calls the operating system for execution on the CPU. Hardware interactions are generally managed by various firmware and processing resources commonly referred to as a chipset. For example, INTEL CPUs typically leverage a chipset technology known as Active Management Technology (AMT) that runs on a Management Engine (ME) called by a Platform Controller Hub (PCH).

One concern with firmware executed by processing elements, such as that executed by the chipset, is that malicious code can "root" in the firmware instructions to expose information of the system in a manner that is difficult to detect. For instance, malicious code that roots into firmware can alter security functions of the operating system so that the malicious code becomes essentially undetectable. To prevent such malicious attacks, the chipset often includes security measures that ensure that only authorized firmware executes. For example, the INTEL PCH will not load ME firmware, a BIOS boot block, or the BIOS if AMT ME firmware detects even a single bit error in the firmware code image stored in flash memory, such as on an SPI flash integrated circuit. For instance, a hash of the firmware image is performed by the PCH and compared against an expected value before the firmware is permitted to execute. If a bit error is detected in a flash memory, error correcting code can correct the bit error.

A difficulty with firmware security measures is that detection of a bit error prevents execution of firmware, effectively disabling the information handling system. For example, the BIOS, BIOS boot block and AMT firmware cannot correct bit errors in the AMT firmware because the PCH chipset will not even load ME firmware, the BIOS boot block or the BIOS if the AMT firmware has even a single bit error in the image stored in flash memory, such as an SPI flash integrated circuit. With no logic available to correct the bit error, a motherboard replacement or SPI flash integrated circuit replacement is typically performed to fix the information handling system. Similar fatal errors may occur in other processing elements that execute firmware, such as storage devices, network devices, graphics devices, etc . . . .

SUMMARY OF THE INVENTION

Therefore, a need has arisen for a system and method which error corrects firmware of an information handling system processing element.

In accordance with the present invention, a system and method are provided which substantially reduce the disadvantages and problems associated with previous methods and systems for managing firmware errors in an information handling system processing element, such as a secure chipset. Firmware executing on an embedded controller, such as at initial power up of the information handling system pre-boot, compares chipset firmware against expected values, such as stored hash or error correcting checksum, to detect errors in the chipset firmware that may prevent secure chipset execution, such as single bit errors. Error correction is attempted for detected errors and confirmed before execution of the chipset firmware on the chipset.

More specifically, an information handling system processes information with a central processing unit (CPU) that executes instructions stored in memory. An embedded controller manages power of the information handling system and executes pre-boot code retrieved from a flash memory that calls an operating system from persistent memory for execution on the CPU. The pre-boot code includes initiation of chipset firmware execution on a chipset, such as a Platform Control Hub chipset by Intel that executes an Active Management Technology Management Engine. Before initiation of chipset firmware execution, pre-boot code of the embedded controller ensures that the chipset firmware stored in the flash memory does not include errors, such as single bit errors that will fail at the chipset due to security measures. For example, pre-boot code of the embedded controller compares an expected hash value of the chipset firmware, such as from the chipset firmware manifest, against a computed hash value for the chipset firmware stored in the flash memory. If an error exists in the chipset firmware, an error correction checksum is applied to attempt to correct the error and another comparison is performed to confirm error correction. Once the chipset code is confirmed as error free, the embedded controller initiates execution of the chipset code. If a chipset error persists, an error indication is provided, such as by illuminating an LED with the embedded controller.

The present invention provides a number of important technical advantages. One example of an important technical advantage is that critical regions of flash memory verified by chipset firmware to authorize boot are separately validated by a pre-boot function before initiation of the chipset firmware. If chipset firmware is corrupt, pre-boot error correction corrects the corruption so that chipset firmware authenticates and executes correctly. If pre-boot error correction cannot resolve corruption, such as may happen if malicious code is inserted in the firmware, an error indication is provided with an appropriate failure code, such as a flashing LED. By making error correcting code available, motherboard and/or flash memory replacement is avoided at manufacture when an error prevents boot, such as failure of chipset firmware to execute due to a single bit error, thus avoiding unnecessary replacement of parts. Further, in one example embodiment, error correcting code in pre-boot logic that applies to chipset firmware adds just 18 KB of data in the flash memory to cover 1.5 MB of chipset flash partitions, so that error correcting code generally does not need additional flash memory size or parts.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system embedded controller validates chipset firmware to support error correction before initiation of the chipset firmware by the embedded controller. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
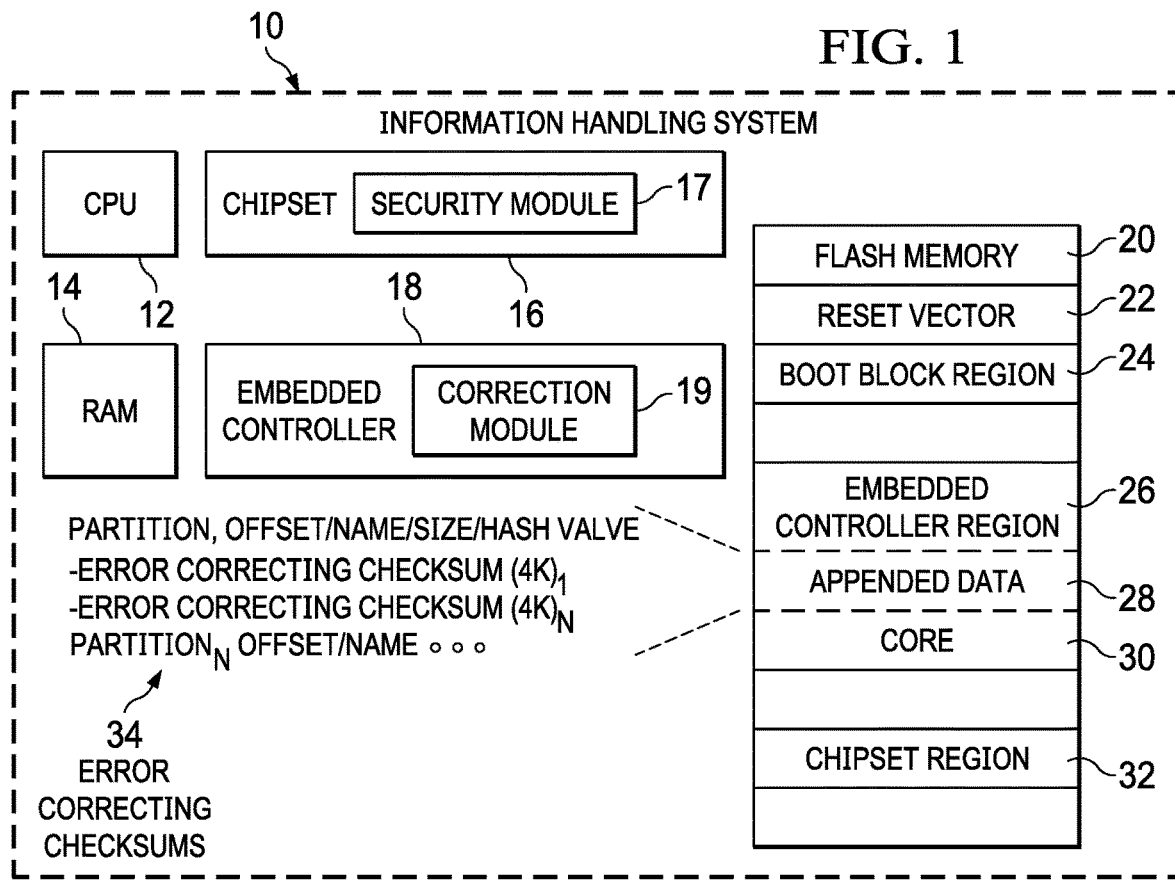
FIG. 1 depicts a block diagram of an information handling system having single bit error correction performed by an embedded controller against chipset firmware of a secure chipset.

Referring now to FIG. 1, a block diagram depicts an information handling system 10 having single bit error correction performed by an embedded controller 18 against chipset firmware stored in a chipset region 32 that executes on a secure chipset 16. In the example embodiment, information handling system 10 executes instructions with a central processing unit (CPU) 12, such as instructions of an operating system and/or applications retrieved from persistent memory, such as a hard disk drive or solid state drive. Instructions and information processed by CPU 12 are stored in a random access memory (RAM) 14, and managed by a chipset 16. Generally, a chipset has one or more processing elements that manage data flow in information handling system 10. In the example embodiment described herein, chipset 16 is a Platform Control Hub (PCH) manufactured by INTEL for specific types of CPUs, although alternative embodiments may include chipsets that work with other types of CPUs and other manufacturer's CPUs. PCH chipsets execute an Active Management Technology Management Engine (AMT ME) with a secure initiation that will not run unless the chipset firmware code authenticates at the chipset. To initiate chipset operation, an embedded controller 18 provides power to chipset 16 and toggles a chipset pin, such as an SLP_A signal. Chipset 16 then retrieves chipset firmware from chipset region 32 and authenticates the chipset firmware with a security module 17 before execution. If the chipset firmware fails authentication, chipset 16 will fail the execution, which prevents further execution of the information handling system, such as the Basic Input/Output System (BIOS) and operating system. Embedded controller 18 includes a correction module 19 that prevents system failure related to chipset firmware authentication failure. The correction module may initiate upon an indication of chipset failure, or upon an initial power up of the information handling system. For example, a flag is set once chipset firmware authentication is established to sidestep additional authentications until an update or other change to the chipset firmware is performed.

Embedded controller 18 is, for example, a keyboard controller that manages application of power to components of information handling system 10, such as by controlling power rails through GPIO interfaces. For example, embedded controller 18 interfaces with a power button to initiate a power-up sequence of information handling system 10 on a power button input. The power-up sequence includes application of power to processing components of information handling system 10, such as chipset 16, and execution of pre-boot code to retrieve the BIOS and operating system for execution on CPU 12. In addition, embedded controller 18 coordinates interactions between physical components, such as by supporting interfaces with input devices. Flash memory 20 is, for example, a 4 GB SPI flash memory integrated circuit that has partitions to store firmware code, such as a reset vector region 22, a boot block region 24, an embedded controller region 26 having an appended data region 28 and core region 30, and a chipset region 32.

In the example embodiment, embedded controller 18 includes a correction module in pre-boot code that executes on system power up to validate and correct chipset 16 firmware before initiating execution of chipset firmware on chipset 16. At application of power, embedded controller 18 retrieves core code from an embedded controller region 26 of flash memory 20, such as through a Serial Peripheral Interface (SPI) link. In addition, embedded controller 18 has access to appended data 28 that includes error correction checksums 34 associated with selected portions of chipset firmware stored in a chipset region 32. For example, error correcting checksums 34 are calculated from a clean image of chipset firmware before inclusion in flash memory 20 for critical regions that chipset 16 authenticates to authorize execution. For instance critical region error correcting checksums 34 are calculated in 4 KB portions for static portions of chipset 16 firmware and associated mapping to the firmware by manifest information, such as a memory offset. In the example embodiment embedded controller appended data 28 is depicted as including additional information derived from the chipset firmware manifest, such as the name, size and hash value of chipset firmware partitions, although the manifest may be included with the chipset firmware so that the information may instead be derived from the manifest.

Embedded controller 18 validates chipset firmware before initiation of chipset 16 by retrieving chipset firmware from chipset region 32 and comparing values of critical regions against expected values. In one embodiment, embedded controller 18 retrieves the hash values stored in the manifest and compares the retrieved hash values with hash values calculated by embedded controller 18 from the chipset firmware stored in chipset region 32. If embedded controller 18 detects a mismatch between hash values of the manifest and calculated hash values, error correcting checksums 34 are applied at the portion of chipset firmware having the error to attempt to correct the error, such as a single bit error associated with storage of chipset firmware in chipset region 32. In one example embodiment, error correction checksums are generated for critical chipset firmware regions 4 KB at a time where a region that has less than 4 KB of data is padded with zeros to create a 4 KB error correction block. This example embodiment allows 48 bytes of error correction data to repair a single bit error for each 4 KB sector. For a 1.5 MB chipset firmware image, single bit error correction adds only 18 KB of storage to flash memory 20. The example embodiment compares calculated hashes with hash values stored in the manifest for a rapid validation of chipset firmware integrity stored in flash memory 20. If an error is detected, error correction checksums 34 relevant to the error are applied for rapid correction of the error. In an alternative embodiments where manifest hash values are not available or cannot be directly compared to a calculated hash, error correction checksums may be used to perform the error detection logic. Generally, the error correction checksum is a hash that also includes error correction information. As used herein, the term error correction checksums may include cyclical redundancy check error correcting code, hash codes and other types of error correcting codes that allow correction of errors to firmware stored in flash memory.

In one example embodiment, embedded controller 18 sets a flag that indicates whether chipset firmware has successfully started on chipset 16 so that authentication by embedded controller 18 does not have to be performed at each initiation of chipset 16. Once embedded controller 18 authenticates chipset firmware, the flag is set to avoid subsequent authentication. If an error occurs in chipset initiation, the error triggers a change in the flag setting and a restart of the embedded controller to initiate another chipset firmware authentication. In addition, if an update is performed to chipset firmware stored in flash memory 20, the flag is reset so that the updated chipset may be authenticated by embedded controller 18 before execution on chipset 16. For example, upon update of chipset firmware, an update is made to embedded code 18 firmware appended data so that error correction data is available should a single bit error occur in the copying of the updated chipset firmware to flash memory 20. After authentication and, if necessary, correction of the updated chipset firmware, the flag is reset to bypass subsequent authentication. In one embodiment, the previous chipset firmware and appended data is retained until a successful update so that chipset 16 can revert to the original chipset firmware and error correction data if chipset 16 fails to execute the updated chipset firmware.

Figure 2:
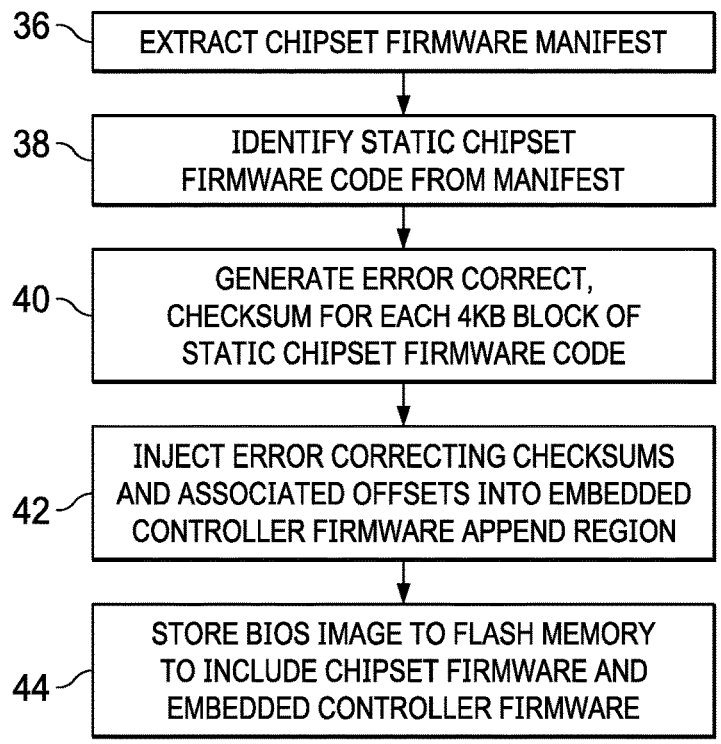
FIG. 2 depicts a flow diagram of a process for integrating error correction with embedded controller firmware that corrects chipset firmware.

Referring now to FIG. 2, a flow diagram depicts a process for integrating error correction with embedded controller firmware that corrects chipset firmware. At step 36, during BIOS binary image creation at design and manufacture of information handling system 10, the chipset firmware manifest is extracted from the chipset firmware binary. For example, each element of the chipset firmware manifest contains a partition name, offset within the chipset firmware region, length, and hash. At step 38 static chipset firmware code is identified from the manifest as critical regions that cannot include single bit errors. Chipset 16 validates chipset firmware static code before each execution, while dynamic code changes over time. In an alternative embodiment, dynamic values of chipset firmware maintained in flash memory 20 may also be tracked to have error correction data generated and stored before each system shutdown.

At step 40 error correcting checksums are generated for the identified static code in 4 KB blocks and mapped to memory offsets of the BIOS image, such as memory locations of flash memory 20. In alternative embodiments, other sized granularity of blocks of data may be blocked to create error correcting checksums, such as to optimize correction speed if error correction is needed or to optimize storage space if flash memory is limited. At step 42, the error correcting checksums and associated offsets are injected into the BIOS image, such as an appended region of embedded code firmware. During normal starts in which hash values of the chipset firmware manifest match hash values computed from the chipset firmware image, the error correcting checksums are not needed. If, however, a mismatch is detected in the hash comparison, the region that has the mismatch is paired to the error correcting checksums based upon offset values so that error correction may be performed. In some instances, a hash mismatch will involve a memory area that includes multiple error correcting checksums. As is set forth above, the error correcting checksums may include additional information for various architectures, such as hash value, size and name information for each error correcting checksum. Once the error correcting information is appended to the embedded controller firmware in the BIOS image, at step 44 the BIOS image is stored in flash memory to include the chipset firmware, embedded controller firmware and other BIOS elements.

Figure 3:
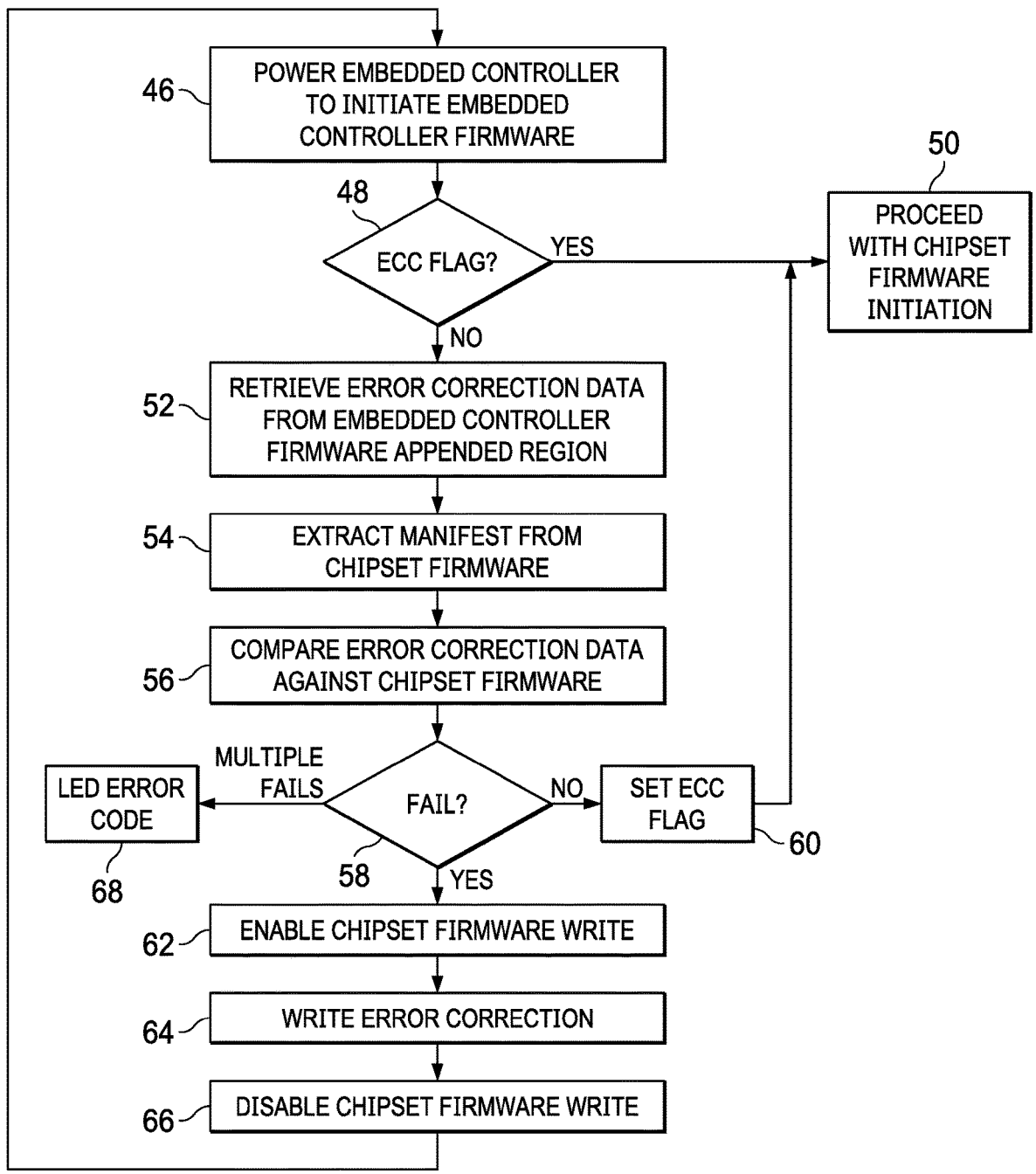
FIG. 3 depicts a flow diagram of a process for checking chipset firmware against expected values with embedded controller firmware having integrated error correction for the chipset firmware.

Referring now to FIG. 3, a flow diagram depicts a process for checking chipset firmware against expected values with embedded controller firmware having integrated error correction for the chipset firmware. The process starts at step 46 with application of power at the embedded controller, which initiates embedded controller firmware. At step 48 a flag is checked to determine if the chipset firmware has already been authenticated and, if yes, the process ends at step 50 by proceeding with chipset initiation. If at step 48 the chipset firmware has not been verified by the embedded controller, the process continues to step 52 to retrieve error correction data from the embedded controller firmware appended region. For instance, reference to the error correction information identifies the critical regions of the chipset firmware for which error correction is available so that non-relevant areas do not have to be hash checked from manifest hash values. In one alternative embodiment, error correction checksums may be used at this point in the process to validate the chipset firmware instead of using manifest hash comparisons.

At step 54, the embedded controller retrieves the manifest from the chipset firmware. At step 56, error correction data is compared against chipset firmware to validate that the chipset firmware image does not have a fault, such as a single bit error. To provide the most rapid check, manifest hash values are used for the comparison against calculated hash values generated by the embedded controller from the chipset firmware image, such as by reference to manifest memory locations and lengths. Performing hash checks on larger chunks of data takes less time as compared with the smaller data sizes associated with error correction checksums. If at step 58 no hash mismatches are detected, the process continues to step 60 to set the error correction flag to indicate authentic chipset firmware and the process ends at step 50 with initiation of chipset firmware. If a failure occurs at step 58 and multiple failures have been detected, the process continues to step 68 to illuminate an LED error code.

If at step 58 a failure is detected by a mismatch of the calculated and stored hash, the process continues to step 62 to enable chipset firmware write at the flash memory so that a correction can be attempted to the chipset firmware image. In one embodiment, the embedded controller enables a write by turning off all system power except for the embedded controller itself and asserts a write protection override signal at the flash memory, and then asserts a global reset to latch the write protection signal. At step 64, the embedded controller performs error correction to the chipset firmware. For example in the sector identified as having a hash mismatch, the embedded controller calculates error correction for the sector and compares the error correction generated at BIOS binary image creation. If the error corrections result in an error correction checksum match the embedded controller deasserts the write protection override signal and returns to step 46 to reset the embedded controller to ensure that the error corrected. If at step 64 the error correction fails to provide a match with the error correction checksum, the system detects a failure and illuminates LED error code at step 66. In various embodiments, detected hash mismatches may be corrected as detected or may be stored for one correction sequence that takes place after the manifest hash comparison is complete.

Figure 4:
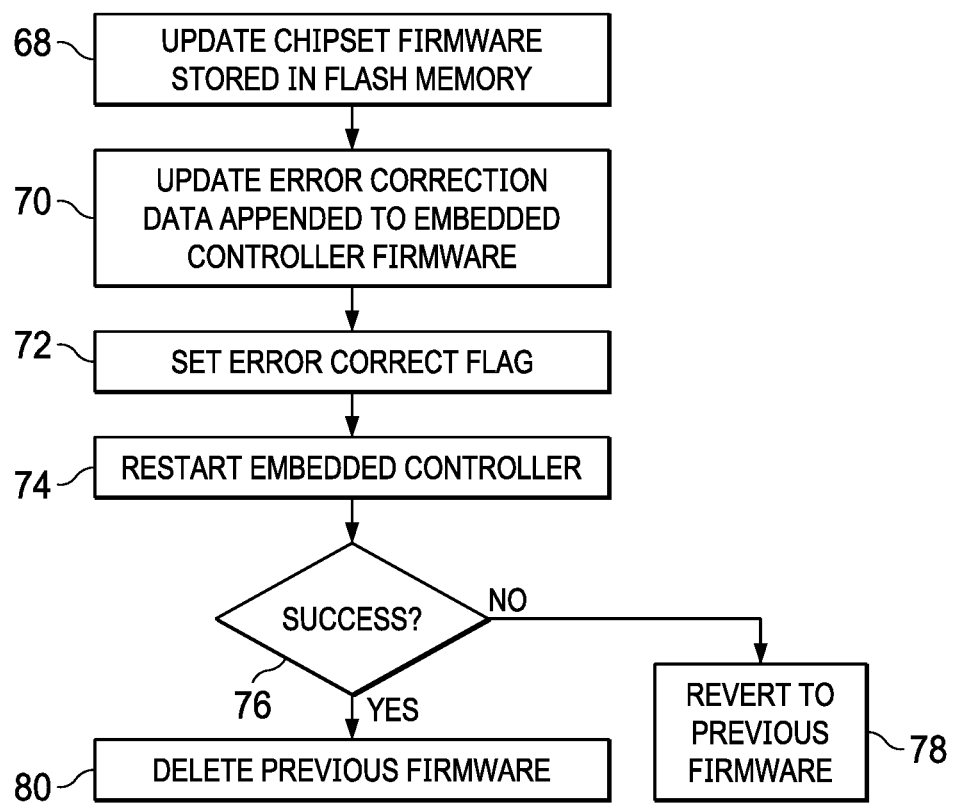
FIG. 4 depicts a flow diagram of a process for updating chipset firmware at an information handling system.

Referring now to FIG. 4, a flow diagram depicts a process for updating chipset firmware at an information handling system. The process starts at step 68 by updating chipset firmware stored in flash memory by copying the new firmware into the flash memory. At step 70, updated error correction checksums that correct the new copy of chipset firmware is copied into flash memory, such as in the error correction data appended to embedded controller firmware. At step 72 the error correction flag is set so that at the next restart the embedded controller will verify the chipset firmware against the manifest hash. At step 74, the embedded controller restarts to execute validation of chipset firmware. If at step 76 a success does not result, the process ends at step 78 to revert to the previous chipset firmware and error correction. If the update succeeds at step 76 the process ends at step 80 with deletion of the previous chipset version.

Although described in the example embodiment as error correction performed against chipset firmware by embedded controller firmware, in alternative embodiments, other types of processing elements may be used, such as devices that use option ROMs.

Although the present invention has been described in detail, it should be understood that various changes, substitutions and alterations can be made hereto without departing from the spirit and scope of the invention as defined by the appended claims.

What is claimed is:

1. An information handling system comprising:
a central processor unit (CPU) operable to execute instructions to process information;
a memory interfaced with the CPU and operable to store the instructions and information;
a first processing element interfaced with the CPU to support CPU operations;
a second processing element interfaced with the CPU and the first processing element to support CPU operations;
a flash memory interfaced with the first and second processing elements, the flash memory storing first firmware that executes on the first processing element and second firmware that executes on the second processing elements;
a security module executable on the first processing element to authenticate the first firmware before executing the first firmware on the first processing element; and
a correction module executable on the second processing element, the correction module comparing the first firmware with expected values, the correction module initiating execution of the first firmware on the first processing element if the first firmware has the expected values, the correction module initiating correction of the first firmware in the flash memory if the first firmware lacks one or more of the expected values;
wherein:
the correction module is further operable to detect failure of correction of the first firmware and in response illuminate an LED to indicate the failure; and
the second firmware includes checksums for plural portions of the first firmware and the checksums comprise the expected values, the correction module computing checksums from the first firmware stored in the flash memory to compare with the checksums included in the second firmware.

2. An information handling system comprising:
a central processor unit (CPU) operable to execute instructions to process information;
a memory interfaced with the CPU and operable to store the instructions and information;
a first processing element interfaced with the CPU to support CPU operations;
a second processing element interfaced with the CPU and the first processing element to support CPU operations;
a flash memory interfaced with the first and second processing elements, the flash memory storing first firmware that executes on the first processing element and second firmware that executes on the second processing elements;
a security module executable on the first processing element to authenticate the first firmware before executing the first firmware on the first processing element; and
a correction module executable on the second processing element, the correction module comparing the first firmware with expected values, the correction module initiating execution of the first firmware on the first processing element if the first firmware has the expected values, the correction module initiating correction of the first firmware in the flash memory if the first firmware lacks one or more of the expected values;
wherein:
the first processing element comprises a chipset that manages CPU operations; and
the second processing element comprises an embedded controller that manages power at chipset.

3. The system of claim 2 wherein the embedded controller compares checksums of static portions of the chipset firmware stored with the embedded controller firmware against checksums of the static portions computed from the chipset firmware as stored in the flash memory.

4. The system of claim 3 wherein the embedded code firmware stores the checksums of the static portions to include an offset of the static portion in the chipset firmware.

5. The system of claim 2 wherein the embedded code firmware stores the checksums of the static portions to include error correction.

6. The system of claim 2 wherein the embedded controller compares a hash of the chipset firmware static portions stored with the embedded controller firmware against a hash of the static portions computed from the chipset firmware as stored in the flash memory.

7. A method for secure boot of an information handling system, the method comprising:
applying power to an embedded controller;
executing pre-boot instructions at the embedded controller, the pre-boot instructions including access to plural predetermined checksums of chipset firmware;
computing with the embedded controller plural checksums for the chipset firmware from a copy of the chipset firmware stored in a flash memory;
comparing the predetermined checksums and the computed checksums;
initiating execution of the chipset firmware at a chipset with a command from the embedded controller only if the predetermined checksums and computed checksums match; and
executing the chipset firmware at the chipset with a security protocol;

in response to initiating execution of the chipset firmware at the chipset with the match of the predetermined and computed checksums, setting a flag to indicate the match; and
at subsequent starts of the embedded controller, if the flag indicates the match then initiating execution of the chipset firmware without the computing and the comparing.

8. The method of claim 7 further comprising:
initiating error correction of the chipset firmware stored in the flash memory with the embedded controller if the predetermined checksums do not match the computed checksums; and
restarting the embedded controller after the error correction.

9. The method of claim 8 further comprising:
detecting plural attempts at error correction of the chipset firmware; and
in response to detecting plural attempts at error correction, illuminating an LED with the embedded controller.

10. The method of claim 7 further comprising:
updating the chipset firmware stored in the flash memory;
updating the embedded controller plural predetermined checksums for the chipset firmware; and
setting the flag to remove the indication of a match so that the computing and the comparing are performed at the next embedded controller execution of pre-boot instructions.

11. The method of claim 10 further comprising:
retaining the chipset firmware and the plural predetermined checksums for the chipset firmware in a non-updated state;
detecting failure of an error correction of the updated chipset firmware; and
in response to detecting failure of an error correction, reverting to the non-updated state for the chipset firmware.

12. A method for secure boot of an information handling system, the method comprising:
applying power to an embedded controller;
executing pre-boot instructions at the embedded controller, the pre-boot instructions including access to plural predetermined checksums of chipset firmware;
computing with the embedded controller plural checksums for the chipset firmware from a copy of the chipset firmware stored in a flash memory;
comparing the predetermined checksums and the computed checksums;
initiating execution of the chipset firmware at a chipset with a command from the embedded controller only if the predetermined checksums and computed checksums match;
executing the chipset firmware at the chipset with a security protocol;
creating the plural predetermined checksums of the chipset firmware from a copy of the chipset firmware that has passed the security protocol;
including error correction with each predetermined checksum; and
storing an offset with each predetermined checksum, the offset indicating a location in the flash memory at which code corresponding to the checksum may be retrieved.

13. The method of claim 12 wherein creating the plural predetermined checksums further comprises:
determining from a manifest of the chipset firmware static and non-static portions of the chipset firmware; and creating the plural predetermined checksums for only the static portions.

14. A method for manufacture of an information handling system having a secure chipset that executes chipset firmware, the method comprising:
- extracting a manifest from the chipset firmware, the manifest defining plural partition offsets;
- creating error correcting checksums for selected of the chipset firmware, each error correcting checksum associated with an offset derived from the plural partition offsets;
- inserting the checksums and associated offsets into embedded controller firmware;
- storing the embedded controller firmware and chipset firmware in a flash memory of the information handling system; and
- validating the chipset firmware against the checksums using the embedded controller before executing the chipset firmware on the chipset;
- detecting a mismatch of the chipset firmware stored in the flash memory against the checksums of the embedded controller firmware; and in response to detecting a mismatch, applying error correction of the checksum to the chipset firmware stored in the flash memory.

15. The method of claim 14 further comprising:
analyzing the manifest to determine static and non-static portions of the chipset firmware; and
selecting the static portions to create the error correcting checksums.

16. The method of claim 14 wherein the chipset firmware is an active management technology management engine.

* * * * *